US007152692B2

(12) United States Patent
Hurskainen et al.

(10) Patent No.: US 7,152,692 B2

(45) Date of Patent: Dec. 26, 2006

(54) HYDRAULIC HAMMER HAVING A SEALING BUSHING

(75) Inventors: Arvo Hurskainen, Lahti (FI); Esko Juvonen, Lahti (FI)

(73) Assignee: Sandvik Tamrock Oy, Tampere (FI)

( * ) Notice: Subject to any disclaimer, the term of this patent is extended or adjusted under 35 U.S.C. 154(b) by 31 days.

(21) Appl. No.: 11/046,684

(22) Filed: Feb. 1, 2005

(65) Prior Publication Data

US 2005/0167131 A1 Aug. 4, 2005

(30) Foreign Application Priority Data

Feb. 2, 2004 (FI) .................................. 20040156

(51) Int. Cl.
*B23B 45/16* (2006.01)

(52) U.S. Cl. .......................... 173/16; 173/14; 173/200; 173/128; 173/91

(58) Field of Classification Search .................. 173/14, 173/16, 200, 206, 207, 138, 128, 213, 91; 408/238, 239, 241
See application file for complete search history.

(56) References Cited

U.S. PATENT DOCUMENTS 3,213,615 A 10/1965 Bjornberg
3,701,386 A * 10/1972 Feucht ........................ 173/78
3,940,151 A 2/1976 Phillips
4,149,602 A * 4/1979 James ........................ 173/207
4,745,981 A * 5/1988 Buske ........................ 173/202
5,056,606 A 10/1991 Barthomeuf
5,893,419 A * 4/1999 Hodges ....................... 173/13
6,119,795 A * 9/2000 Lee ............................ 173/114
6,155,353 A * 12/2000 Ottestad ..................... 173/128
6,328,116 B1 * 12/2001 Hurskainen et al. ........ 173/128
6,510,904 B1 * 1/2003 Tyrrell ........................ 173/132
6,739,398 B1 * 5/2004 Yokley et al. .............. 166/382
2003/0000715 A1 1/2003 Ullrich et al.

FOREIGN PATENT DOCUMENTS

EP 752297 A2 * 1/1997
FR 2596681 A 10/1987

OTHER PUBLICATIONS

Finnish Official Action for Finnish Priority Application No. 20040156.

* cited by examiner

*Primary Examiner*—Rinaldi I. Rada
*Assistant Examiner*—Brian Nash
(74) *Attorney, Agent, or Firm*—Drinker Biddle & Reath LLP

(57) ABSTRACT

A hydraulic hammer having a sealing bushing includes a percussion piston that delivers strokes to a tool. A lower part of the percussion piston is sealed with respect to a frame by the sealing bushing, which includes one or more lower seals. The sealing bushing does not contribute to the bearing of the percussion piston and it is arranged in place through the lower end of the hydraulic hammer.

11 Claims, 5 Drawing Sheets

HYDRAULIC HAMMER HAVING A SEALING BUSHING

BACKGROUND OF THE INVENTION

The invention relates to a hydraulic hammer comprising: a frame, which is an elongated piece and comprises an upper end and a lower end; a percussion device having an elongated percussion piston that is reciprocatingly movable into a stroke direction and a return direction by means of hydraulic pressure. The invention further relates to a tool bushing for supporting a tool to a hydraulic hammer.

A hydraulic hammer is used as an additional device in an excavating machine or other basic machine for example for purposes of breaking rock, concrete, or some other relatively hard material. The hydraulic power needed by the hydraulic hammer can be led to the hammer's percussion device from a hydraulic circuit of the basic machine. The percussion device delivers strokes to a tool attached to the hydraulic hammer and the tool transmits the strokes to the material to be broken. The percussion device usually includes a percussion piston, which makes a reciprocating movement by the impact of hydraulic pressure and delivers strokes to a stroke surface on the upper end of the tool. At the same time when delivering strokes with the percussion piston, the tool is pressed against the material to be broken, whereby the tool penetrates into the material by the impact of the strokes and the pressing, and causes the material to break. The hydraulic part of the percussion piston is sealed to prevent leakage of hydraulic fluid. However, a problem with hydraulic hammers is the arrangement of seals at the lower end of the percussion piston, i.e. at its tool side end. In current solutions the mounting of the seals and the changing thereof in connection with maintenance is laborious.

BRIEF DESCRIPTION OF THE INVENTION

It is an object of the invention to provide a novel and improved hydraulic hammer and tool bushing.

The hydraulic hammer of the invention is characterized in that the hydraulic hammer comprises at least one sealing bushing arranged in an annular space between the percussion piston and the frame; the inner diameter of the sealing bushing is dimensioned larger than the outer diameter of the percussion piston at the sealing bushing, whereby there is a clearance between the inner diameter of the sealing bushing and the outer diameter of the percussion piston; on the inner circumference of the sealing bushing there is at least one lower seal for sealing the clearance; the sealing bushing is arranged in place through the tool side frame end; and the sealing bushing is locked in place to the frame.

The tool bushing of the invention is characterized in that the first inner circumference of the tool bushing comprises at least one seal arranged to seal the clearance between the percussion piston of the hydraulic hammer and the first inner circumference of the tool bushing; and the tool bushing comprises at least one locking member for locking the tool bushing in place relative to the frame of the hydraulic hammer and for locking, at the same time, the tool such that the tool is movable for a predetermined distance in axial direction.

An essential idea of the invention is that the lower part of the hydraulic hammer is provided with a sealing bushing through which the lower end of the percussion piston is loosely arranged. The inner diameter of the sealing bushing is provided with at least one lower seal sealing the clearance between the lower end of the percussion piston and the inner diameter of the bushing. The sealing bushing does not contribute to the bearing of the percussion piston, but the piston is provided with separate bearing members. Another essential idea of the invention is that the sealing bushing is arranged in place through the lower part of the frame into an annular space arranged between the percussion piston and the frame.

An advantage of the invention is that the sealing bushing can be detached through the lower part of the frame without having to dismantle the hydraulic part of the percussion device. Consequently, there is no need to detach the percussion piston, bearings, valves, or other hydraulic components when the sealing bushing is changed, which enables rapid and less complex maintenance. Since the sealing bushing can be changed without dismantling the hydraulic part, entering of impurities into the hydraulic part can be avoided. Moreover, since the sealing bushing does not function as a bearing for the percussion piston, it can be manufactured with less precision and, in addition, there is more freedom of choice as regards the dimensioning and structure of the sealing bushing and the characteristics of the material it is made of.

An essential idea of an embodiment of the invention is that the sealing bushing is an integral part of the tool bushing. In that case the hydraulic hammer may consist of fewer parts and, in addition, the assembly and maintenance of the hammer may be rapid. Further, it may have a simple structure, because the tool bushing and the sealing bushing part at the upper end thereof may be attached in place by means of a tool-retaining pin.

An essential idea of another embodiment of the invention is that at least a portion of the lower part of the percussion piston is bearing-mounted to bearing surfaces formed to the frame of the hydraulic hammer. With a bearing surface formed directly to the frame, the manufacture and mounting of a separate bearing bushing is avoided. In addition, it is relatively simple to machine a bearing surface that is accurate in dimension and shape directly to the frame. Bearings formed to the frame are also rigid and provide good support for the percussion piston. It is also possible to form all percussion piston bearings directly to the frame. In some cases, however, the upper end of the percussion piston may be bearing-mounted by means of a separate bearing bushing or the like.

An essential idea of yet another embodiment of the invention is that the inner circumference of the sealing bushing is provided with at least two seals arranged at a predetermined distance from one another in axial direction. In the stroke direction, the first seal is the actual lower seal arranged to prevent hydraulic fluid from flowing away from the percussion device and out of the hydraulic part of the percussion device. This keeps the hydraulic hammer clean, and hydraulic fluid does not get into the environment. Still viewed in the stroke direction, the second seal is what is known as a dust seal, which is arranged to prevent outside impurities from entering into the percussion device through the lower end of the hydraulic hammer. This prevents impurities from penetrating into the hydraulic fluid of the hydraulic hammer and thereby to the hydraulic system of the entire basic machine. Preventing impurities from entering into the hammer also enables premature wear of the hammer and disturbances caused by impurities to be avoided.

An essential idea of an embodiment of the invention is that the percussion device comprises at least one groove arranged before the first, i.e. lower, seal of the sealing bushing, in the stroke direction. In addition, the groove is connected to a pressure fluid discharge channel, whereby pressure fluid leaked through the clearances between the percussion piston and the frame is allowed to flow into the groove and further to the discharge channel.

An essential idea of yet another embodiment of the invention is that the sealing bushing is a separate piece supported in axial direction in place by means of a tool bushing. In that case the sealing bushing does not necessarily have to be provided with any separate means of attachment, which may simplify the structure of the hammer.

An essential ideal of yet another embodiment of the invention is that the sealing bushing is a separate piece with at least one locking member for locking the sealing bushing in place. In that case the attachment of the sealing bushing is independent of that of the tool bushing. When the tool bushing is changed, the sealing bushing stays in place, which may facilitate the maintenance of the hammer.

It should be mentioned that in this application 'lower end' refers to the tool side end of the hydraulic hammer and its components.

BRIEF DESCRIPTION OF THE DRAWINGS

The invention will be described in greater detail in connection with the following drawings, in which.

For the sake of clarity, the invention shown in the Figures has been simplified. An attempt has been made to indicate like parts with like reference numbers.

DETAILED DESCRIPTION OF SOME EMBODIMENTS OF THE INVENTION

Figure 1:
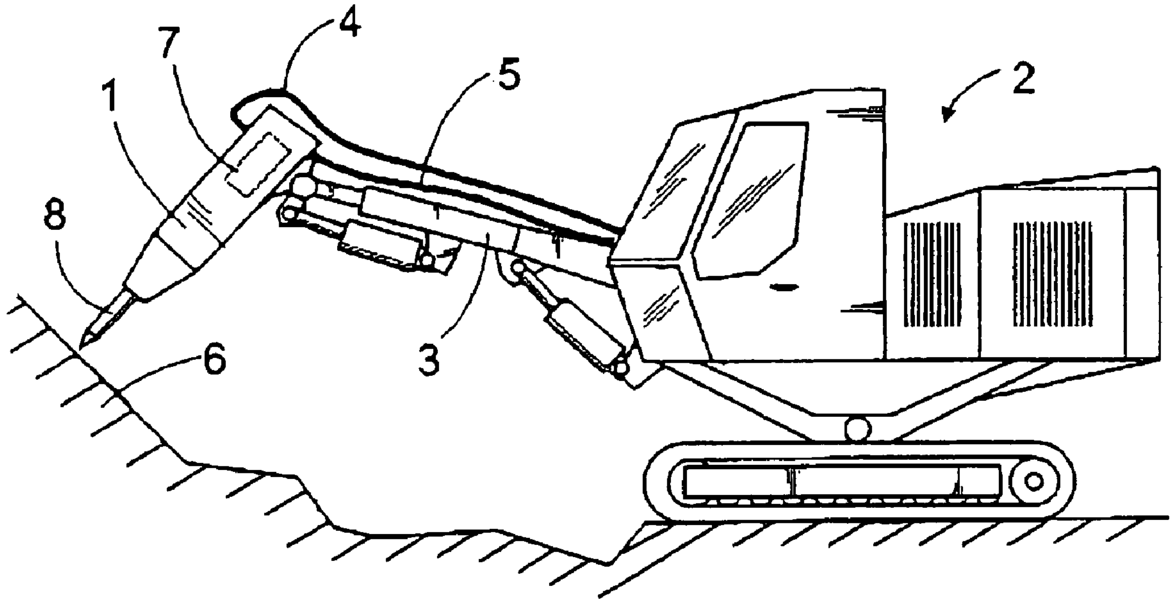
FIG. 1 is a schematic side view of a hydraulic hammer arranged to an excavating machine beam.

In FIG. 1 a hydraulic hammer 1 is arranged to a free end of a beam 3 of an excavating machine 2. The hydraulic hammer 1 has a supply channel 4 for supplying hydraulic fluid to the hammer and, further, a discharge channel 5 for leading away the fluid. Thus the hydraulic hammer 1 may be connected to a hydraulic system of the excavating machine 2. With the beam 3 the hydraulic hammer 1 is pressed against material 6 to be broken, while at the same delivering strokes with a percussion device 7 of the hammer to a tool 8 attached to the hammer, the tool transmitting the strokes to the material. The hydraulic hammer 1 may be arranged to any movable basic machine or to a beam mounted to a fixed base, for example.

Figure 2:
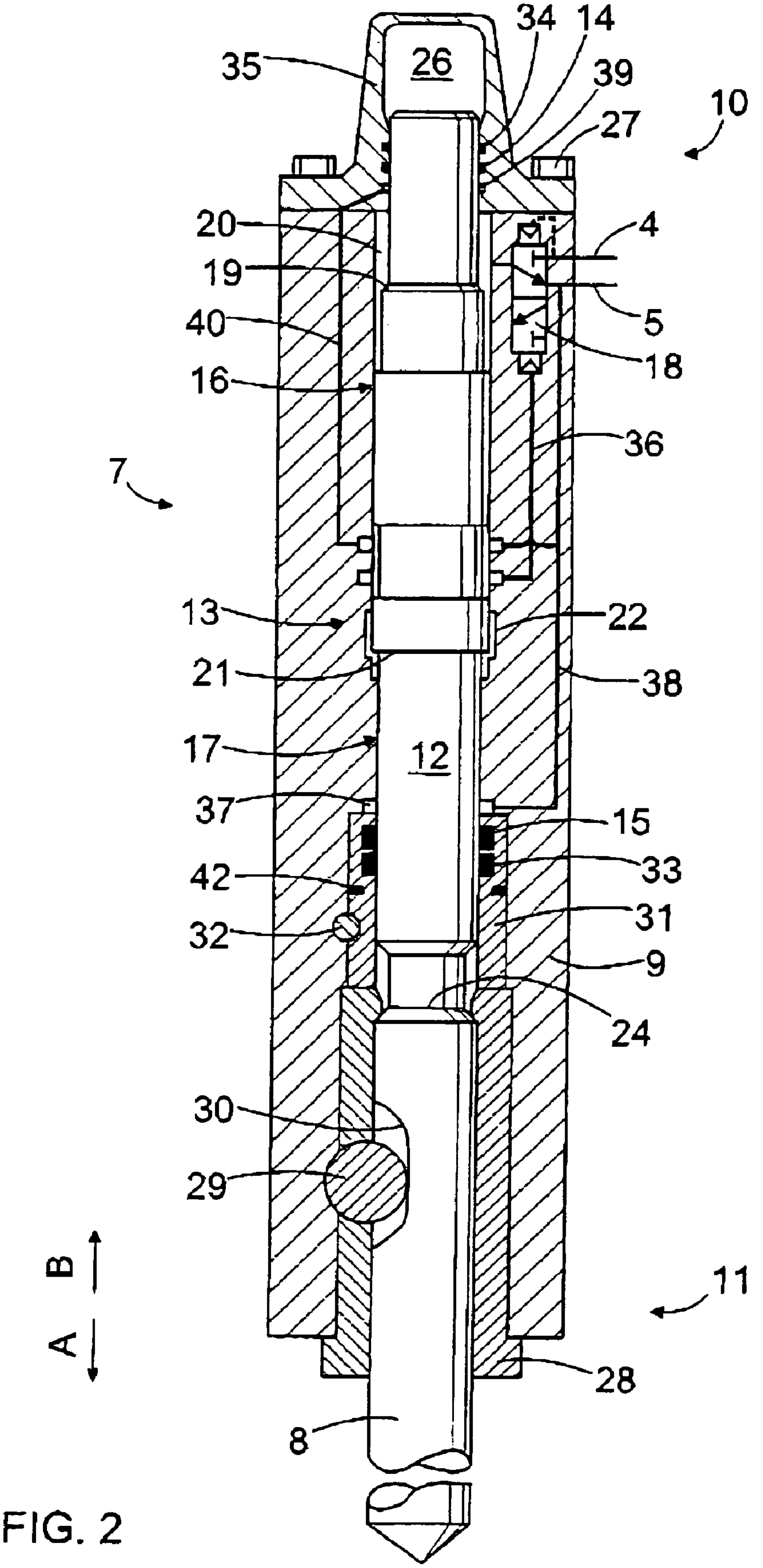
FIG. 2 is a schematic sectional view of a hydraulic hammer of the invention.

The hydraulic hammer 1 of FIG. 2 comprises an elongated frame 9 having an upper end 10 and a lower end 11. The tool 8 is arranged to the lower end 11 of the frame 9. In the embodiment of FIG. 2 the frame 9 consists of a single frame piece and thus it may be very rigid and solid. The frame 9 may in itself form a casing protecting the hydraulic hammer 1 or, alternatively, a protective casing may be arranged around the frame 9. The frame 9 may be provided with a space for the percussion device 7, which has a percussion piston 12 that is movable in a stroke direction A and a return direction B. Further, pressure spaces with a hydraulic pressure acting therein may be formed around the percussion piston 12. The percussion piston 12 may be provided with a plural number of shoulders or other surfaces that may be subjected to the hydraulic pressure acting in the pressure spaces. The portion of the percussion device 7 subjected to the hydraulic pressure may be called a hydraulic part 13. The hydraulic part 13 may be sealed at upper end of the percussion piston 12 by one or more upper seals 14 and at the lower end by one or more lower seals 15. In some constructions the upper seal 14 is not necessary. Further, a portion of the upper end of the percussion piston 12 may be bearing-mounted by means of an upper bearing 16 formed to the frame 9 and a portion of the lower end by means of a lower bearing 17 formed to the frame 9. The bearings 16 and 17 may be cylindrical surfaces of a desired length. The bearings 16 and 17 are relatively easy to form directly to the frame 9 by machining, whereby separate bearing sleeves or the like are not needed.

FIG. 2 further shows a control valve 18, which may be arranged into the structure of the hydraulic hammer 1 or which may be a separate external component. With the control valve 18 the hydraulic pressure can be guided to act on the upper shoulder 19 of the percussion piston 12 and, correspondingly, away from the upper shoulder 19. The control valve 18 may be a directional control valve, for example, which in the position shown in FIG. 2 may guide the hydraulic fluid from the upper pressure space 20 to the discharge channel 5. The upper shoulder 19 is thus no longer subjected to hydraulic pressure, but hydraulic pressure acting on the lower shoulder 21 of the percussion piston 12 makes the piston 12 move in a return movement direction B. A lower pressure space 22 that is in contact with the lower shoulder 21 may be in a continuous connection to the supply channel 4 via channel 23. For the sake of clarity, channel 23 has been simplified in FIG. 3. When the control valve 18 changes its position, hydraulic fluid is allowed to flow from the supply channel 4 through the control valve 18 into the upper pressure space 20, whereby hydraulic pressure acting on the upper shoulder 19 makes the percussion piston 12 move in the stroke direction A. Since the effective sectional surface area of the upper shoulder 19 is greater than that of the lower shoulder 21, the percussion piston 12 moves in the stroke direction A and delivers a stroke to a stroke surface 24 at the upper end of the tool 8. The control valve 18 can thus be used for controlling the hydraulic pressure acting in the pressure space 20 to thereby create a reciprocating movement of the percussion piston 12. In some cases it is naturally possible to control the piston 12 also in other ways. The control valve 18 is usually pressure-controlled, but in some cases it may be controlled in other ways, too, for example electrically. FIG. 2 shows a control channel 36 for leading control pressure to the control valve 18.

The upper end 10 of the frame 9 of the hydraulic hammer 1 may be provided with one or more hydraulic accumulators 25 for enhancing the strokes delivered with the percussion piston 12 and for balancing pulsation appearing in the pressure and volume flow of the hydraulic fluid. In FIG. 2 the upper end 10 of the frame 9 has what is known as a piston accumulator arranged thereto, in which the upper end of the percussion piston 12 penetrates into the hydraulic accumulator 25, thereby changing the volume of the chamber 26 of the hydraulic accumulator 25. The hydraulic accumulator 25 may form a kind of a cover piece, fastened with bolts 27, for example, to the upper end 10 of the frame 9. The hydraulic accumulator 25 may naturally also have some other prior art construction known per se. If the hydraulic accumulator 25 does not form the uppermost portion of the frame 9, the upper end 10 of the frame may be provided with a suitable cover.

Figure 3:
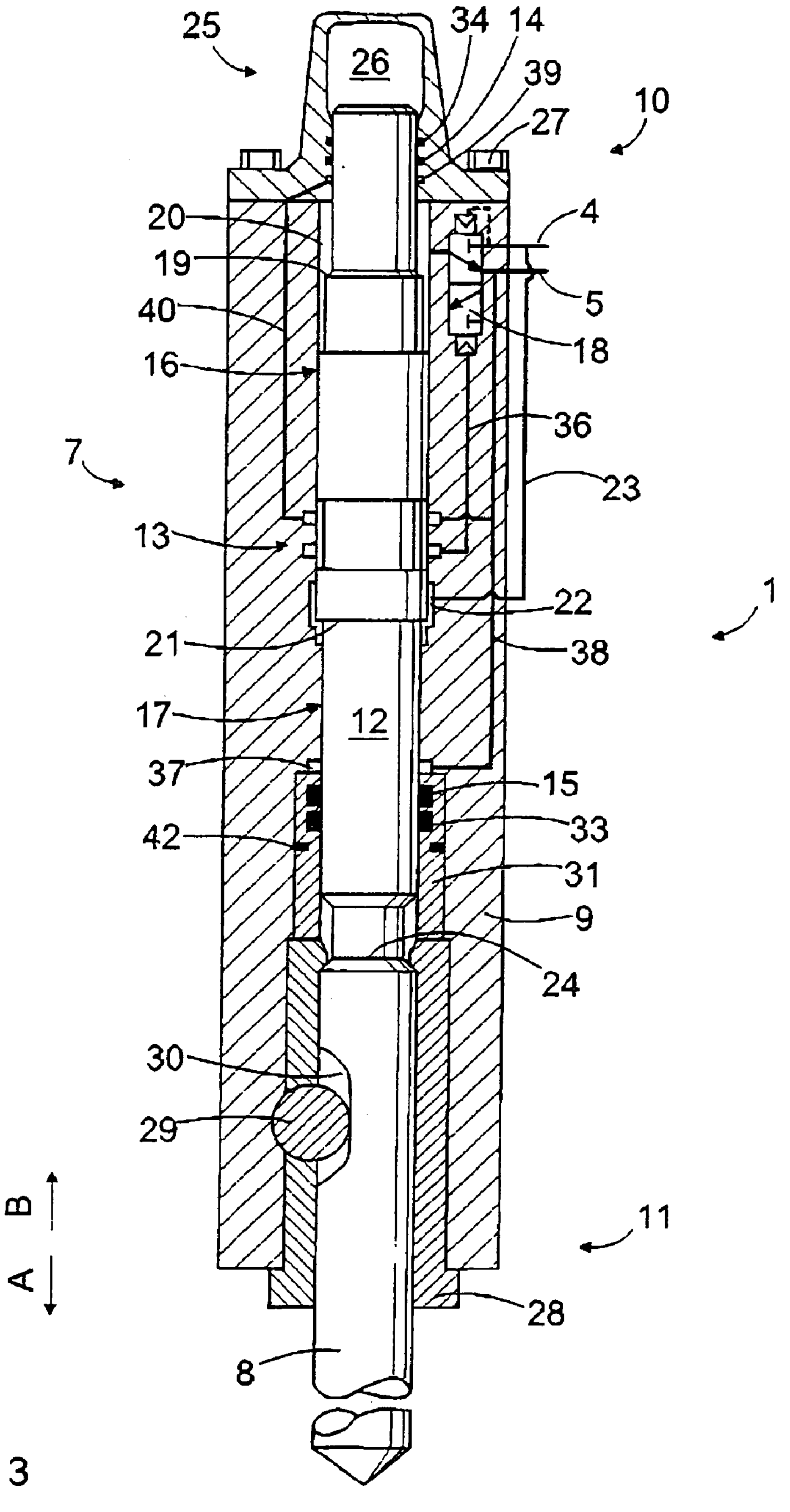
FIG. 3 is a schematic sectional view of a second hydraulic hammer of the invention.

FIG. 2 also shows an application of the structure of the lower end 11 of the hydraulic hammer 1. The tool 8 is supported to the frame 9 by means of a tool bushing 28. The tool 8 and the tool bushing 28 may be locked to the lower end 11 of the frame 9 by means of a retainer pin 29 or the like. The tool 8 may be provided with a portion 30 allowing the tool 8 to move in axial direction for a predetermined distance. On the percussion piston 12 side of the tool bushing 28 there may be a sealing bushing 31 arranged loosely around the lower part of the percussion piston 12 such that the inner diameter of the sealing bushing 31 is not in contact with the percussion piston 12. Hence the sealing bushing 31 does not contribute at all to the bearing of the lower part of the percussion piston 12, the lower part being supported by the lower bearing 17. The sealing bushing 31 may be locked in place with a separate locking member 32, such as a retainer pin, screw joint, screw, or by some other suitable means. Further, in accordance with the inventive idea, the sealing bushing 31 is arranged in place in an annular space between the percussion piston 12 and the frame 9 through the lower end of the frame 9, i.e. the end facing the tool 8. The sealing bushing 31 can thus be detached after the tool bushing 28 has first been detached from the lower end 11 of the frame 9. Consequently, it is not necessary to dismantle the structure of the hydraulic part 13 when the sealing bushing 31 is changed. The sealing bushing 31 may be further provided with one or more lower dust seals 33 aiming at preventing impurities from entering into the hydraulic part 13. The lower dust seal 33 may be arranged to the inner circumference of the sealing bushing 31, at a distance from the lower seal 15. One construction of the sealing bushing will be described later in connection with FIG. 5. Further, the upper end 10 of the hydraulic hammer 1 may be provided with an upper dust sealing 34 that may be arranged to seal a clearance between the cover 35 and the percussion piston 12. The upper dust seal 34 prevents the entry of impurities into the hydraulic part 13 at the upper end of the percussion piston 12. In the solution of FIG. 3 the hydraulic accumulator 25 functions as the cover 35, whereby the upper dust seal 34 may prevent gas or some other medium present in the chamber 26 from penetrating into the hydraulic part 13.

As shown in FIG. 3, one or more lower grooves 37, which may be connected to the hydraulic fluid discharge channel 5 via a drain channel 38, may be formed to the front side of the sealing bushing 31, i.e. to the side of the percussion piston 12. This allows hydraulic fluid leaking through the lower bearing 17 and the clearances to be led away, and thus the lower seal 15 is not subjected to a high pressure and damaging of the seal 15 can be avoided. High-pressure hydraulic fluid can namely damage the seal 15, because high pressure increases friction between the percussion piston 12 and the seal 15. Correspondingly, an upper groove 39, which may be connected to the discharge channel 5 via a drain channel 40, 38, may be provided between the seal 14 of the upper end of the percussion piston 12 and the hydraulic part 13. By means of the grooves 37, 39 and the drain channels 38, 40 the seals 14, 15 may be rendered substantially non-pressurized, and thus they may have a long service life.

FIG. 3 shows an application in which the sealing bushing 31 is supported in place by means of the tool bushing 28 in axial direction. Here the tool retainer 29 acts as a locking member for both the tool bushing 28 and the sealing bushing 31, which has no separate locking members. Thus the lower end 11 of the hydraulic hammer 1 may be simple in structure.

Figure 4:
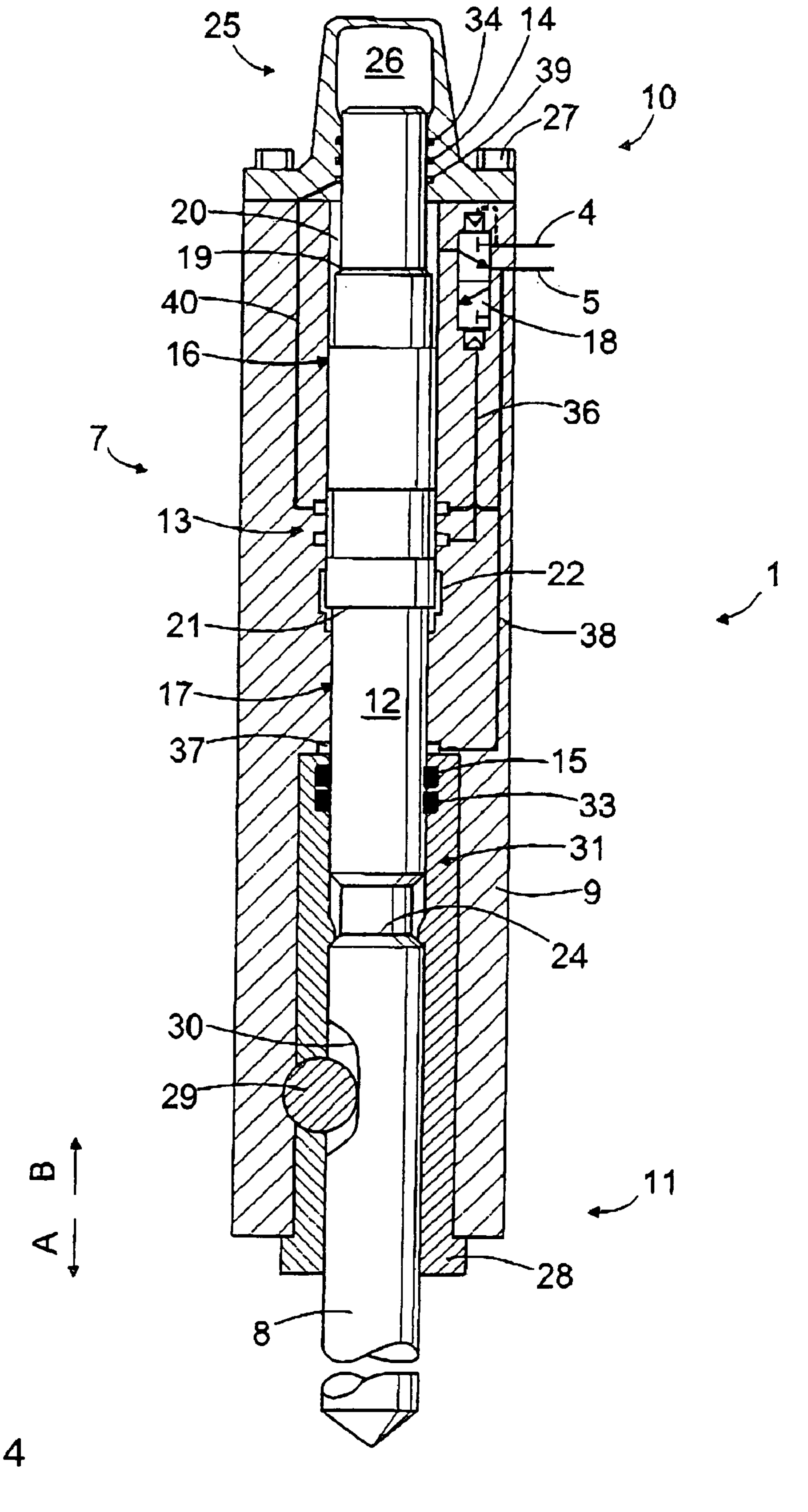
FIG. 4 is a schematic sectional view of a third hydraulic hammer of the invention.

FIG. 4 shows an application in which the sealing bushing 31 is an integral part of the upper end of the tool bushing 28. In this case the tool bushing 28 is a piece arranged to the lower end 11 of the frame 9 to support the tool 8 to the frame 9 and, further, to seal the side of the percussion piston 12 facing the tool. The upper part of the tool bushing 28, i.e. the portion facing the percussion piston 12, is provided with a sealing bushing portion 31 to the inner diameter of which the lower seal 15 of the percussion piston is arranged. The tool bushing 28 does not contribute in any way to the bearing of the percussion piston 12. The tool bushing 28 may be locked in place by means of one or more locking members 29, such as a locking pin, and it may extend from the lowest portion of the frame 9 all the way to the lower bearing 17 of the percussion piston 12. Also this solution can be implemented with grooves 37, 39 and drain channels 38, 40 needed for rendering the seals 14, 15 free of pressure. With the sealing bushing 31 and the tool bushing 28 combined into a single piece, the lower part of the hammer can be easily and rapidly dismantled in connection with maintenance, for example. In addition, there are fewer components than before, which facilitates the manufacture of the hammer.

Figure 5:
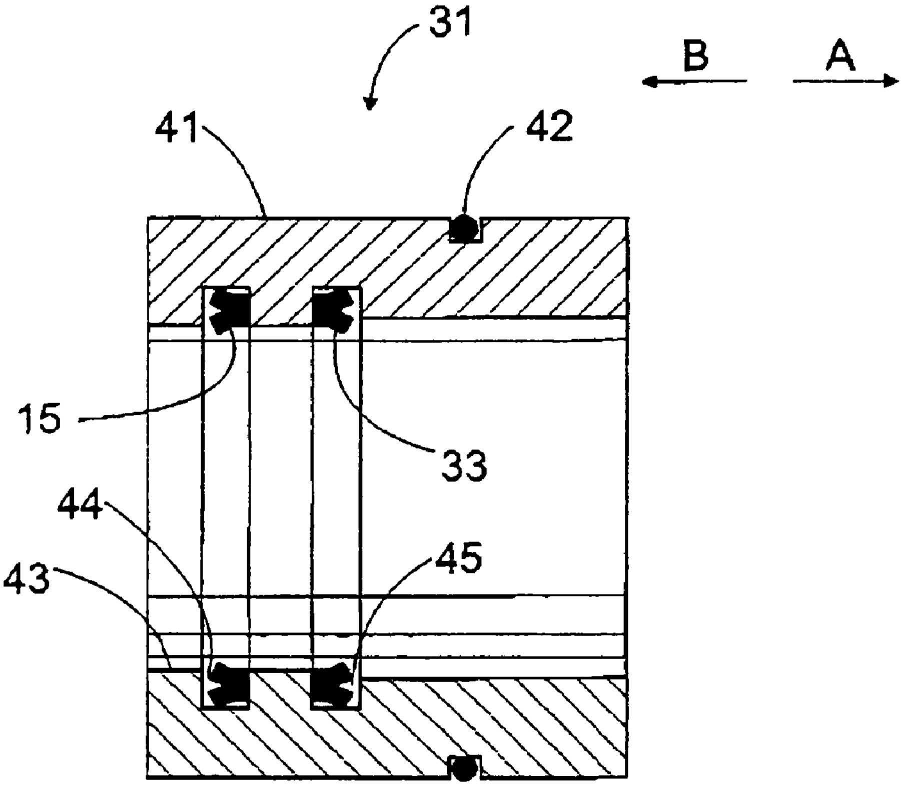
FIG. 5 is a schematic sectional view of a sealing bushing belonging to a hydraulic hammer of the invention.

FIG. 5 shows a sectional view of a sealing bushing 31. The outer circumference 41 of the sealing bushing may be provided with one or more seals 42 allowing the sealing bushing 31 to be sealed against the frame 9. The seal 42 may be what is known as a static seal, such as an O-ring. Due to the seal 42 the sealing bushing 31 can be dimensioned to fit loosely into the space in the frame 9, which facilitates the manufacture of the sealing bushing 31 and the frame 9. It is naturally possible to also use other kind of sealing between the bushing 31 and the frame 9. In the stroke direction A, the inner circumference 43 of the sealing bushing 31 may be provided with a first groove 44 into which the lower seal 15 of the percussion piston 12 may be arranged. Further, the inner circumference 43 may be provided with a second groove 45 which is at a distance from the first groove 44 and which may be provided with a lower dust seal 33 or the like. It is to be noted that, if necessary, a plural number of first grooves 44 and seals 15, and also second grooves 45 and dust seals 33 may be provided.

Figure 6:
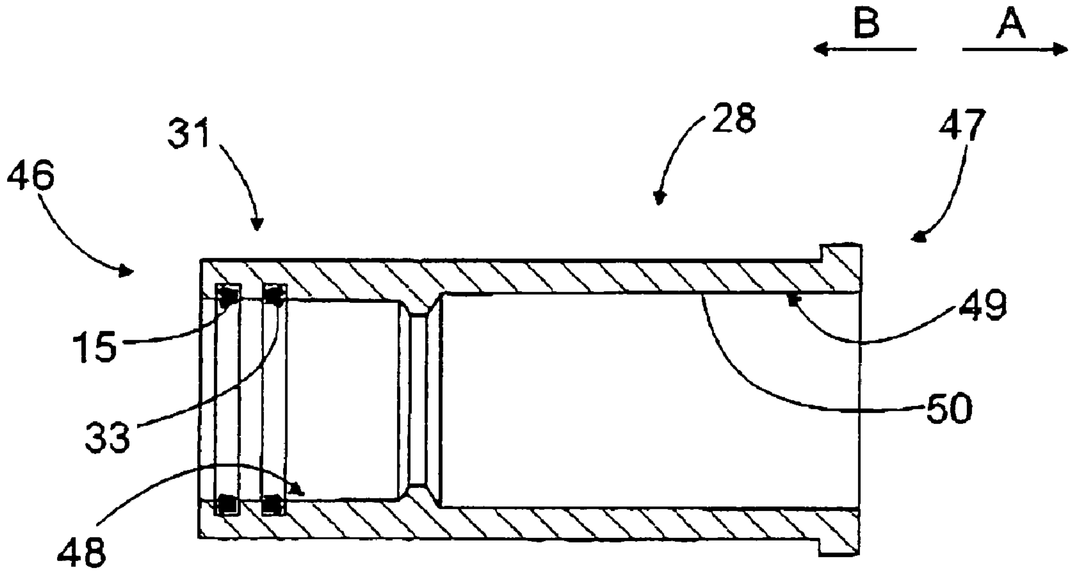
FIG. 6 is a schematic sectional view of a combination of a sealing bushing and a tool bushing belonging to a hydraulic hammer of the invention.

FIG. 6 shows a tool bushing 28 with the integrated sealing bushing portion 31 at the upper end thereof. The tool bushing 28 is an elongated piece that may comprise a first end 46 and a second end 47. The first end 46 has a first inner circumference 48, which is dimensioned such that the lower part of the percussion piston 12 can penetrate partly inside the tool bushing 28. The first inner circumference 48 is provided with at least one seal 15 to seal the percussion piston 12. Further, a portion of the second end of the tool bushing 28 forms a second inner circumference 49 provided with a bearing surface 50 with which the tool 8 can be bearing-mounted to be movable in axial direction. For the sake of clarity, FIG. 6 does not show locking members or tools for locking the tool bushing 28 to the frame 9.

The drawings and the related specification are only meant to illustrate the inventive idea. The details of the invention may vary within the scope of the claims.

What is claimed is:

1. A hydraulic hammer comprising:

a frame, which is an elongated piece and comprises an upper end and a lower end;

a percussion device having an elongated percussion piston that is reciprocatingly movable into a stroke direction and a return direction by means of hydraulic pressure, and a plural number of pressure spaces around the percussion piston;

pressure fluid channels for leading hydraulic fluid to the percussion device and away from it;

a space formed inside the frame for the percussion device;

bearing members mounting the percussion piston to the frame at least at upper and lower parts of the percussion piston;

a tool which the percussion piston is configured to strike in the stroke direction, the tool being configured to transmit the strokes to a material to be broken;

a tool bushing with which the upper part of the tool is bearing-mounted to the frame such that the tool is movable in axial direction;

at least one lower seal for sealing the lower part of the percussion piston, at least one sealing bushing arranged in an annular space between the percussion piston and the frame;

the inner diameter of the sealing bushing is dimensioned larger than the outer diameter of the percussion piston at the sealing bushing, whereby there is a clearance between the inner diameter of the sealing bushing and the outer diameter of the percussion piston;

on the inner circumference of the sealing bushing there is disposed the at least one lower seal for sealing the clearance;

the sealing bushing is arranged in place through the tool side frame end, and the sealing bushing is locked in place to the frame.

2. A hydraulic hammer according to claim 1, wherein at least the lower portion of the percussion piston is bearing-mounted to bearing surfaces formed to the frame.

3. A hydraulic hammer according to claim 1, wherein the inner circumference of the sealing bushing is provided with at least two seals arranged at a predetermined distance from one another in axial direction;

in the stroke direction, a first seal is a lower seal arranged to prevent hydraulic fluid from flowing away from the percussion device; and in the stroke direction, a second seal is a dust seal arranged to prevent outside impurities from entering into the percussion device through the lower end of the hydraulic hammer.

4. A hydraulic hammer according to claim 3, wherein in the stroke direction, the first seal is preceded by a groove;

the groove is connected to a hydraulic fluid discharge channel; and pressure fluid leaking through the clearances between the percussion piston and the frame is arranged to flow through the groove into the discharge channel.

5. A hydraulic hammer according to claim 1, wherein the sealing bushing is a separate piece; and the sealing bushing is locked to the frame substantially immovably by means of at least one locking member provided in the sealing bushing.

6. A hydraulic hammer according to claim 1, wherein the outer circumference of the sealing bushing is sealed to the frame by means of at least one seal.

7. A hydraulic hammer according to claim 1, wherein the frame consists of a single uniform frame piece.

8. A hydraulic hammer according to claim 1, wherein the percussion piston is supported at upper and lower portions thereof to at least two bearing surfaces formed to the frame;

the upper end of the hydraulic hammer is provided with a cover structure having at least one upper seal arranged thereto for sealing the upper end of the percussion piston; and the upper sealing, viewed in the return direction of the percussion piston, is preceded by a groove connected to the pressure medium discharge channel, whereby pressure fluid leaking through the clearances between the percussion piston and the frame is arranged to flow through the groove into the discharge channel.

9. A hydraulic hammer comprising:

a frame, which is an elongated piece and comprises an upper end and a lower end;

a percussion device having an elongated percussion piston that is reciprocatingly movable into a stroke direction and a return direction by means of hydraulic pressure, and a plural number of pressure spaces around the percussion piston;

pressure fluid channels for leading hydraulic fluid to the percussion device and away from it;

a space formed inside the frame for the percussion device;

bearing members mounting the percussion piston to the frame at least at upper and lower parts of the percussion piston;

a tool which the percussion piston is configured to strike in the stroke direction, the tool being configured to transmit the strokes to a material to be broken;

a tool bushing with which the upper part of the tool is bearing-mounted to the frame such that the tool is movable in axial direction;

at least one lower seal for sealing the lower part of the percussion piston, at least one sealing bushing arranged in an annular space between the percussion piston and the frame;

the inner diameter of the sealing bushing is dimensioned larger than the outer diameter of the percussion piston at the sealing bushing, whereby there is a clearance between the inner diameter of the sealing bushing and the outer diameter of the percussion piston;

on the inner circumference of the sealing bushing there is disposed the at least one lower seal for sealing the clearance;

the sealing bushing is arranged in place through the tool side frame end;

the sealing bushing is locked in place to the frame; and the sealing bushing is an integral part of the tool bushing.

10. A hydraulic hammer comprising:

a frame, which is an elongated piece and comprises an upper end and a lower end;

a percussion device having an elongated percussion piston that is reciprocatingly movable into a stroke direction and a return direction by means of hydraulic pressure, and a plural number of pressure spaces around the percussion piston;

pressure fluid channels for leading hydraulic fluid to the percussion device and away from it;

a space formed inside the frame for the percussion device;

bearing members mounting the percussion piston to the frame at least at upper and lower parts of the percussion piston;

a tool which the percussion piston is configured to strike in the stroke direction, the tool being configured to transmit the strokes to a material to be broken;

a tool bushing with which the upper part of the tool is bearing-mounted to the frame such that the tool is movable in axial direction;

at least one lower seal for sealing the lower part of the percussion piston, at least one sealing bushing arranged in an annular space between the percussion piston and the frame;

the inner diameter of the sealing bushing is dimensioned larger than the outer diameter of the percussion piston at the sealing bushing, whereby there is a clearance between the inner diameter of the sealing bushing and the outer diameter of the percussion piston;

on the inner circumference of the sealing bushing there is disposed the at least one lower seal for sealing the clearance;

the sealing bushing is arranged in place through the tool side frame end;

the sealing bushing is locked in place to the frame;

the sealing bushing is a separate piece; and the sealing bushing, viewed in axial direction, is supported in place by means of the tool bushing.

11. A tool bushing for supporting a tool to a hydraulic hammer, the tool bushing being an elongated piece comprising:

a first end and a second end;

an opening extending in axial direction from the first end of the tool bushing to the second end thereof;

a first inner circumference on a portion of the first end of the opening, thus allowing a percussion piston of the hydraulic hammer to be arranged partly inside the first end of the tool bushing;

a second inner circumference on a portion of the second end of the opening, thus allowing the hydraulic hammer tool to be arranged at least partly inside the second end of the tool bushing;

at least one bearing surface on the second inner circumference of the tool bushing for supporting the tool so that it is movable in axial direction, and wherein the first inner circumference of the tool bushing comprises at least one seal arranged to seal the clearance between the percussion piston of the hydraulic hammer and the first inner circumference of the tool bushing; and the tool bushing comprises at least one locking member for locking the tool bushing in place relative to the frame of the hydraulic hammer and for locking, at the same time, the tool such that the tool is movable for a predetermined distance in axial direction.

* * * * *